United States Patent [19]

Kojima et al.

[11] 4,020,944
[45] May 3, 1977

[54] TRANSPORTING APPARATUS

[75] Inventors: Hiromitsu Kojima, Takehara; Kimio Yoshida, Osaka, both of Japan

[73] Assignees: Mitsui Mining & Smelting Co., Ltd., Tokyo; Fuji Sangyo Co., Ltd., Osaka, both of Japan

[22] Filed: Jan. 26, 1976

[21] Appl. No.: 652,303

Related U.S. Application Data

[62] Division of Ser. No. 442,598, Feb. 14, 1974, Pat. No. 3,946,854.

[52] U.S. Cl. .............................. 198/473; 198/678; 198/681
[51] Int. Cl.² ................................... B65G 47/52
[58] Field of Search ............ 214/7, 1 R, 1 BB, 309, 214/8.5 R, 8.5 SS; 198/20 R, 21, 29, 34, 37, 473, 681, 678

[56] References Cited
UNITED STATES PATENTS

| | | | |
|---|---|---|---|
| 2,940,617 | 6/1960 | Reed | 198/21 X |
| 3,148,785 | 9/1964 | Fauconnier | 214/16.1 B X |
| 3,244,303 | 4/1966 | Conner | 214/309 |
| 3,297,379 | 1/1967 | Artaud et al. | 214/16.4 A X |
| 3,799,322 | 3/1974 | Vanlinder et al. | 214/8.5 SS X |
| 3,805,944 | 4/1974 | Yuryan | 198/21 X |

Primary Examiner—Frank E. Werner
Attorney, Agent, or Firm—Woodhams, Blanchard and Flynn

[57] ABSTRACT

A method of transporting objects wherein when the presence of one or more object is detected in a first stock apparatus, a transfer apparatus adapted to transport objects picks up one of the objects from said first stock apparatus and transports it towards a second stock apparatus, and only when the presence of a space for mounting such objects in said second stock apparatus is detected, said transfer apparatus transfers said object onto said second stock apparatus.

7 Claims, 9 Drawing Figures

TRANSPORTING APPARATUS

This is a division of application Ser. No. 442,598 filed Feb. 14, 1974, now U.S. Pat. No. 3,946,854.

BACKGROUND OF THE INVENTION

The present invention relates to a method and apparatus for transporting such objects as electrodes, namely what are referred to as anodes and cathodes, which are mounted on stock apparatuses.

Up to now, for example, in a metallic salt electrolysis operation, in order to facilitate the operation of those mechanical devices which are provided to load and unload electrodes into and from the electrolysis bath, stock conveyors have been utilized which are designed to arrange and stock a suitable number of electrodes in the neighborhood of said mechanical devices. However, in order to perform the operations smoothly, a substantial number of electrodes has to be stocked on hand, requiring huge stock conveyors. Such huge stock conveyors carrying many electrodes are disadvantageous not only because the great loads require strong conveyor construction and driving power, but also because of the hugeness, their operating expense becomes great.

Accordingly, an object of the present invention is to eliminate these disadvantages of conventional designs by arranging several stock conveyors in such a manner that they are linked by an automatically travelling transfer apparatus provided among them, so that with a very simplified stock conveyor design and with relatively small driving power, not only said electrodes, but also similar objects can be efficiently and correctly arranged, stocked and transported.

Another object of the present invention is to provide a transporting apparatus of such a design that comprises a first stock apparatus, a second stock apparatus, and a transfer apparatus disposed between said first and second stock apparatuses, said transfer apparatus so connecting said two stock apparatuses that as soon as the presence of an object on the first stock apparatus is detected, said transfer apparatus lifts it up and transports it to a position above the second stock apparatus, and only when the presence of a space on the second stock apparatus is detected, said transfer apparatus then transfers its load object such as an electrode to the second stock apparatus, thereby even if the first and second stock apparatus have different speeds, a smooth transporting of objects is achieved without such undesirable situations developing as one stock apparatus being fully loaded while the other stock apparatus being empty, and therefore when this transporting apparatus is utilized in transporting electrodes to be supplied to an electrolytic cell, said apparatus can be freely adapted to any automatically operating electrode supplying devices to cause a substantial reduction of the operating expenses.

The present invention will be explained more particularly with reference to the accompanying drawings.

DETAILED DESCRIPTION OF THE INVENTION

Figure 1:
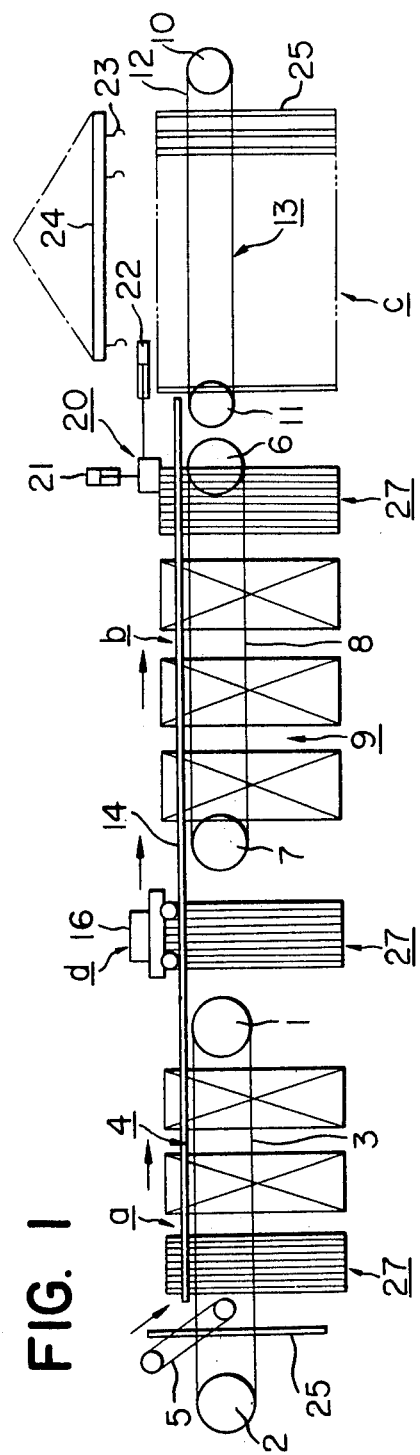
FIG. 1 is a schematic front view of an apparatus embodying the present invention.
Figure 2:
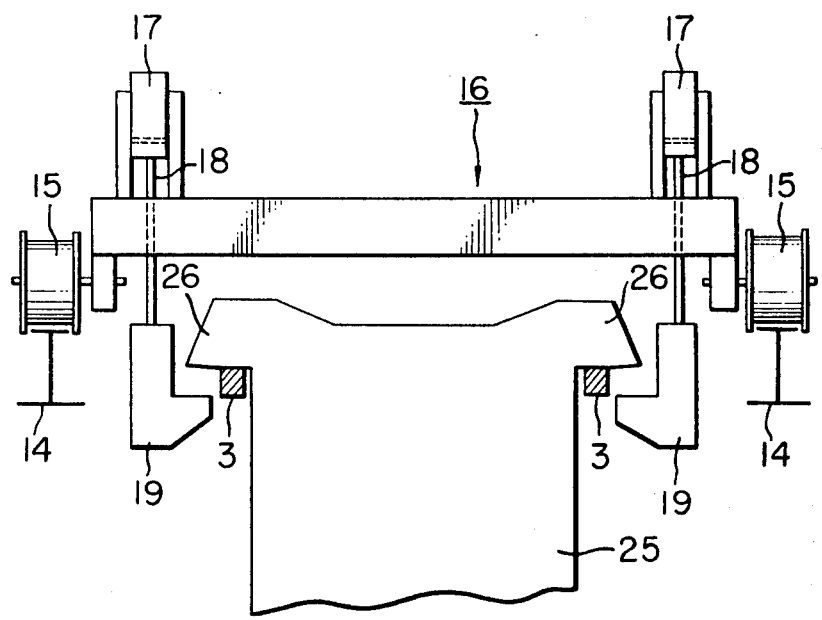
FIG. 2 is a schematic side view of a part of the apparatus shown in FIG. 1, illustrating the method of suspension of the handling object.
Figure 4:
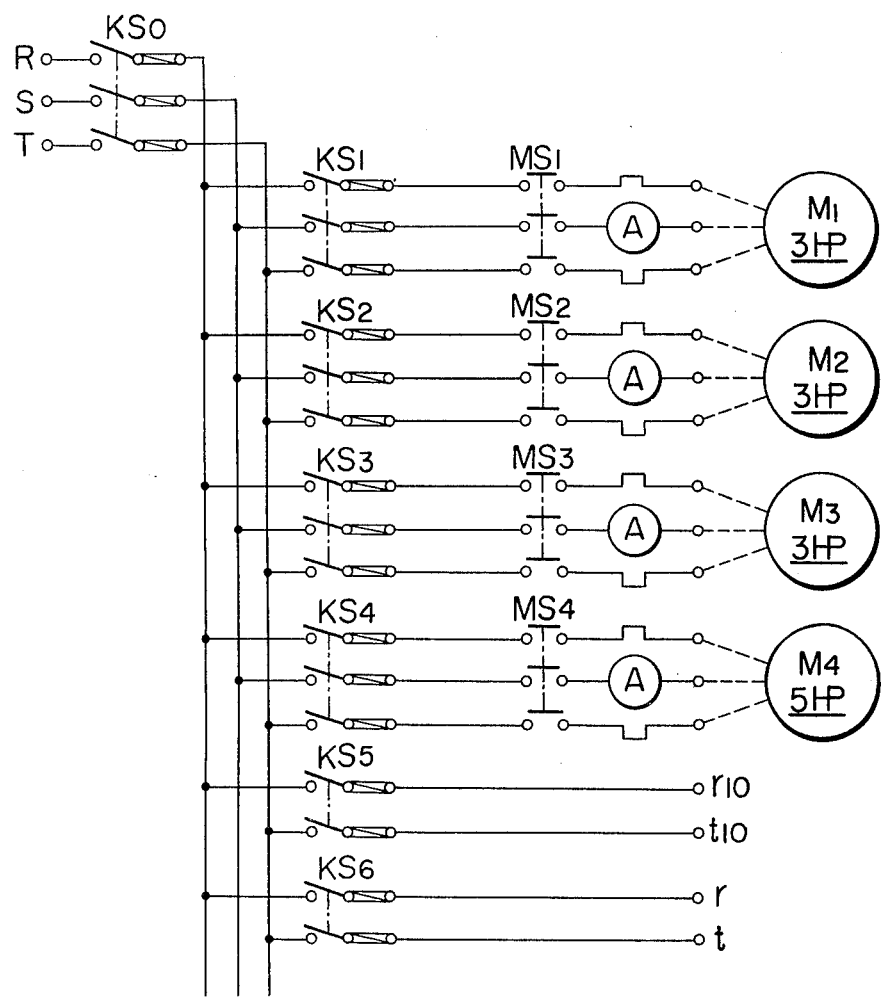
FIGS. 4 through 9 are electric control circuit diagrams showing the control circuit of the apparatus shown in FIG. 1.
Figure 5:
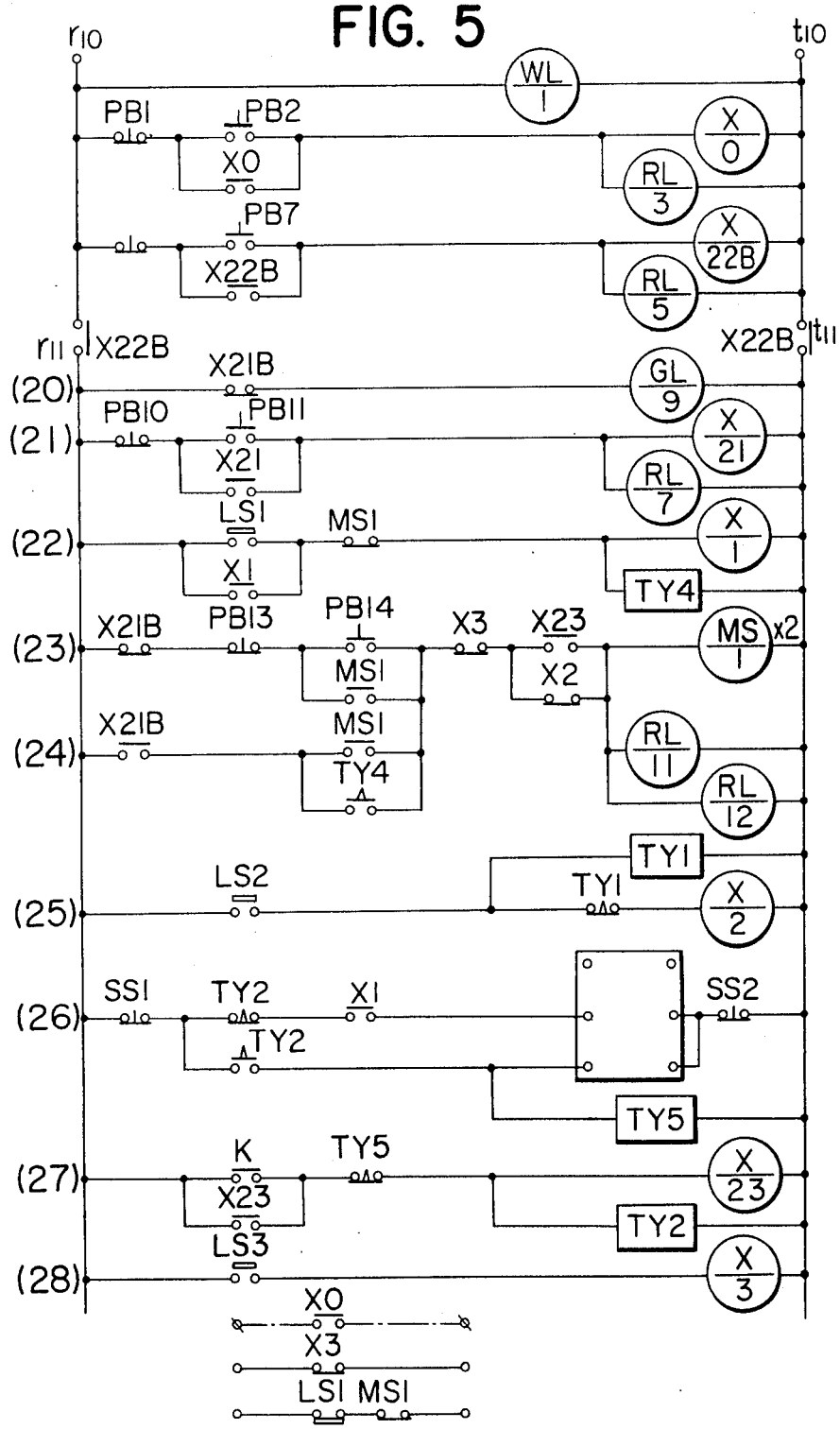

FIG. 1 shows an embodiment of the present invention arranged as an apparatus for inserting electrodes into electrolytic cells, which are not shown. The objects to be transported by an apparatus based on the present invention, namely electrodes 25 in this embodiment, are, as shown in FIG. 2, from 30 to 50 mm in thickness and are provided with lugs 26 outwardly extending from their two top corners.

The illustrated embodiment of the present invention includes a first stock apparatus (a), a second stock apparatus (b), an arranging apparatus (c), and a transfer apparatus (d) provided between said first and second stock apparatuses.

Figure 3:
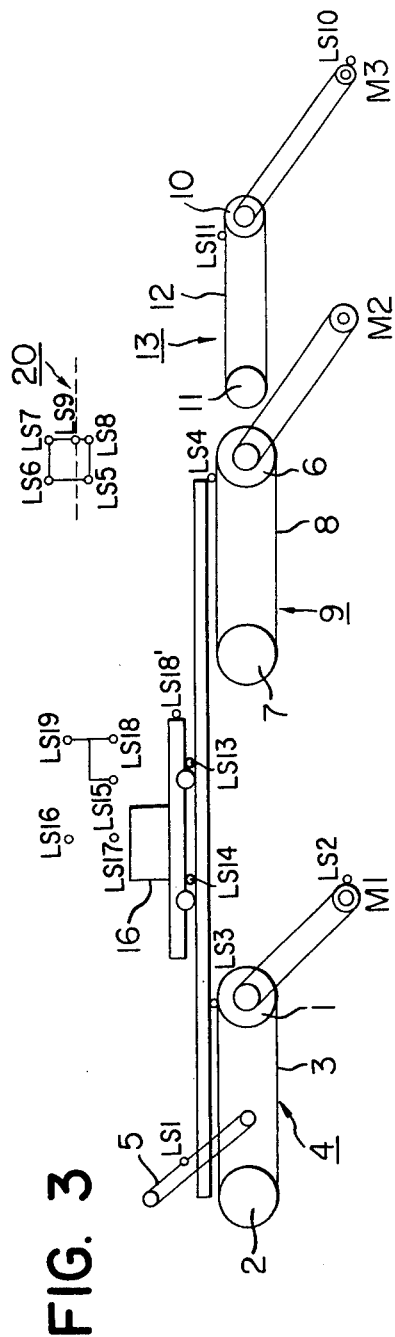
FIG. 3 is a schematic drawing showing the arrangement of the control limit switches installed on the apparatus shown in FIG. 1.

Said first stock apparatus (a) comprises a first stock conveyor 4 incorporating two parallel endless belts 3 spanning driving wheels 1 and guide wheels with the space between the two belts nearly equal or slightly wider than the width of the electrode 25, and a conveyor 5 disposed at the inlet end, intersecting therewith at a descending inclination from a higher position, said first stock conveyor 4 being driven by a motor M1 as shown in FIG. 3, and said conveyor 5 having a plurality of hooks, not shown, arranged at a uniform space on the periphery thereof each of which hooks is adapted to suspend one each electrode.

Said second stock apparatus (b) comprises a second stock conveyor 9 that has its inlet end at a predetermined distance from the outlet end of said first stock conveyor 4 and that is disposed on the same plane as the first stock conveyor 4, said second stock conveyor 9 being made up of two endless belts 8 that span driving wheels 6 and guide wheels 7, in the same way as the first stock conveyor 4, and being driven by a motor M2 as shown in FIG. 3.

Said arranging apparatus c comprises an arranging conveyor 13 that has its inlet end at a predetermined distance from the outlet end of said second stock conveyor 9 and that is disposed on the same plane as the second stock conveyor 9, said arranging conveyor 13 being made up of two endless belts 12 that span driving wheels 10 and guide wheels 11, in the same way as the first stock conveyor 4, and being driven by a motor M3 as shown in FIG. 3.

Said endless belts 3, 8 and 12 incorporated respectively in said conveyors 4, 9 and 13 are all adapted to transport the electrodes 25 by suspending them by the two lugs 26.

There are disposed two rails 14, extending throughout said three stock conveyors 4, 9 and 13 in parallel therewith at a predetermined distance from said conveyors 4, 9 and 13, which rails 14 are spaced above and outwardly of the upper conveyor belt reaches as shown in FIG. 3.

On said rails 14, there is a carriage or truck 16 reciprocating between said stock conveyors 4 and 9, running on wheels 15, said truck 16 constituting said transfer apparatus d, and said truck 16 being provided with two vertical power cylinders 17, one each disposed at each side of said truck 16, with their actuating rods 18 carrying at their lower ends hanging hooks 19 having their longitudinal axis horizontally extending along their travelling direction.

There is also provided a transfer apparatus 20 for transferring the electrodes 25, one at a time, from the outlet end of the second stock conveyor 9 on to the arranging conveyor 13, said transfer apparatus 20 being provided with arms, not shown, which are driven vertically by vertical power cylinders 21 and which are adapted to suspend the electrode 25, said transfer apparatus 20 being driven horizontally by means of a horizontal power cylinder 22. A similar horizontal power cylinder is provided for moving the truck 16.

There is disposed above the arranging apparatus c, a hanger 24 that is designed to be moved by a crane, not shown, and that is provided with a plurality of hanging hooks 23 at its lower portion.

FIG. 3 shows the location of the driving systems and the limit switches that control those driving systems incorporated in the embodiment shown in FIG. 1. The locations of these limit switches will now be explained in conjunction with the movement of the electrodes 25 as follows:

The limit switch LS1 disposed approximately at the middle of the conveyor 5 within the moving range of the electrode suspended from said conveyor, is connected to a counter circuit for counting the passing electrodes and to the control circuit of the first stock conveyor driving motor M1, in such a manner that as soon as an electrode 25 trips said limit switch LS1, said counter registers it, and then, when the electrode 25 descends further and reaches the first stock conveyor 4, the motor M1 is started.

The limit switch LS2 connected to the control circuit of said motor M1 is so actuated by a limit switch actuating disc connected to the motor M1 that it is actuated to stop the motor M1 each time said disc is driven through a preset angle, thereby an intermittent motion is given to the first stock conveyor 4.

Through this intermittent motion of the conveyor 4, electrodes 25 are arrayed on the conveyor 4 in blocks 27 which are normally made up of 10 electrodes arranged at a uniform distance, a plurality of such blocks 27 being disposed, as will be described later, at a uniform spacing on the conveyor 4.

The limit switch LS3 installed on the first stock conveyor 4 at the forward end thereof, is connected to the control circuit of the motor M1 in such a manner that when it is tripped by the forwardmost electrode 25 on the first stock conveyor 4, the motor M1 is stopped.

The limit switch LS14 installed at the bottom left portion of the truck 16 is so connected to the return motion (motion from right to left) control circuit of the truck 16 that when there is no electrode or there is less than one block 27 on the first stock conveyor 4, it is tripped by a stopper, not shown, installed at the left of the conveyor, thus providing the return end position signal for stopping the truck 16. The limit switch LS15 that is installed, together with the limit switch LS18, to be described later, on a limit switch base, not shown, that is vertically movably incorporated in the truck 16 in such a position that it is always in the tripping range of a suspended electrode in the first stock conveyor 4, is connected to the return motion control circuit of the truck 16 in such a manner that when there are one or more blocks of electrodes 25 on the first stock conveyor 4, the returning truck 16 is stopped by the detection (by switch LS15) of the extreme right electrode 25 at such a position as suitable to pick up the block 27 in which the detected electrode belongs.

The limit switches LS16 and LS17, installed on the truck 16 are connected to the control circuit of the vertical movement power cylinders 17 that drives the electrodes hanging hooks 19 in such a manner that when they are tripped during the ascending or descending movement of the hooks, the hook motion is interrupted, thereby the upper stroke end and the lower stroke end are defined for the hooks. The block 27 is engaged with and freed from the hooks 19 at an approximate middle position in this hook stroke.

The limit switch LS13 installed at the bottom right portion of the truck 16, serves to provide an interlocking function for the hook descending power cylinders 17, whereby it is installed in such a position that when the truck 16 is in a forward travelling motion, it is tripped by a stopper that is provided at such a position near the left end of the second stock conveyor 9 that there is a distance corresponding to the space of approximately one block 27 of the electrodes from the left end of the conveyor, with the result that the truck 16 advancing (from left to right) with one block 27 of electrodes suspended therefrom is not allowed to operate the switch for the power cylinder 17 unless at least said limit switch LS13 reaches the position to be tripped by said stopper or moves past it, and furthermore, even if said limit switch LS13 is tripped, the hook 19 still does not descent as long as the truck 16 is kept in motion, whereby the hook 19 is automatically lowered to transfer the block 27 of electrodes only immediately after the truck 16 is brought to a stop.

The limit switch LS18' installed at the upper right end of the truck 16 is connected to the forward motion control circuit of the truck 16 in such a manner that when there is no electrode 25 on the second stock conveyor 9, said limit switch LS18' is tripped by a stopper provided at the right end of said conveyor 9, with the result that a forward stroke end signal is produced and the truck 16 is stopped at that position. The limit switch LS18 installed on the limit switch base is connected to the forward motion control circuit of the truck 16 in such a manner that when there is at least one electrode 25 on the second stock conveyor 9, it is tripped by the leftmost electrode 25 on said conveyor to stop the truck 16, before the limit switch LS18' is tripped by its stopper, with the result that the hooks 19 are allowed to descend and transfer the block 27 of electrodes in the position next to said electrode 25 on the conveyor 9. When the second stock conveyor 9 is fully loaded with electrodes or when there is only a space of size less than one block of electrodes, the advancing truck 16 is stopped as soon as the limit switch LS18 detects the leftmost electrode on the conveyor, but because at this time, the limit switch LS13 is still short of its stopper so that the control circuit of the hooks 19 descending power cylinders is still kept open, even when the truck 16 is stopped, the hooks 19 do not descend. The truck 16 is thereafter allowed to move forward stepwise in phase with the reduction of the electrodes 25 on the conveyor 9, until at last it moves so far to the right that the limit switch LS13 is tripped by its stopper, whereupon the truck 16 stops and simultaneously the hooks 19 descend to transfer the block 27 of electrodes on to the conveyor 9.

The limit switch LS19 is installed on the truck 16 in the moving range of the limit switch base and is connected to the lift motion control of the limit switch base in such a manner so as to provide the upper stroke limit for said base during its upward movement, which is initiated simultaneously with the initiation of a backward motion of the truck 16, which in turn is initiated by the closing of the limit switch LS17 which takes place when the truck 16, appropriately positioned over the stock conveyor 9, lowers the hooks 19 first to transfer a block 27 of electrodes onto the stock conveyor 9, and further lowers finally to actuate the limit switch LS17. Said limit switch base automatically descends after a preset time. The reason for this lifting of the limit switch base is that if it is left in its lower position when the truck 16 returns, the limit switch LS15 installed on it is tripped by the block 27 that has been just transferred on the second stock conveyor 9 with the result that the truck 16 is stopped. It is necessary that at least during the time the truck 16 moves over this block 27, the limit switch base be lifted clear of the block, and then lowered again so as to detect electrodes 25 on the first stock conveyor 4.

The limit switches LS4 (A, B) installed one each on each side of the belts 8 at the right end of the second stock conveyor 9 are connected to the control circuit of the driving motor M2 of that conveyor in such a manner that only when both the limit switches LS4 (A, B) are tripped by an electrode, the motor M2 stops, and the motor keeping on running when only one of the limit switches LS4 is tripped, with the result that any skew hanging position of an electrode on the belts 8 is thereby corrected.

The limit switches LS5, LS6, LS7, LS8 and LS9 all installed on the transfer apparatus 20 are all related to the control circuit of the transfer arm of that transfer apparatus 20 and operates as follows: When said arm trips the limit switch LS5 while the limit switches LS4 (A, B) are being tripped by an electrode 25, immediately, this arm is set in a lifting motion; on its way said arm picks up said electrode and lifts it up further until said arm trips the limit switch LS6 at its upper stroke end; thereupon, said arm starts to move forward (moves from left towards right) keeping its height, and moves on until it trips the limit switch LS7 when it reaches a position above the arranging conveyor 13 of the arranging apparatus c. Because said limit switch LS7 is related not only to the arm control circuit but also to the control circuit of the conveyor 9 driving motor M2, when said arm trips said switch LS7, not only the arm starts to descend immediately, but also the motor M2 is started to drive the second stock conveyor 9, with the result that a next electrode 25 is carried forward until it trips the two limit switches LS4 (A, B) and is stopped by them. On the other hand, said arm keeps on its descending motion, transferring the electrode onto the arranging conveyor 13 on its way, until it trips the limit switch LS8 at its lower stroke end; because this limit switch LS8 is related not only to the arm control circuit but also to the control circuit of the arranging conveyor 13 driving motor M3, when it is tripped, not only said arm starts to move backward (motion from right towards left), but also the motor M3 is started to drive the arranging conveyor 13, thereby sending the electrodes 25 which are found on the arranging conveyor 13 forward. When the returning arm reaches its left stroke end, it trips the limit switch LS5 which in turn initiates the upward motion of said arm; because by this time, an electrode has been sent to the position of the limit switches LS4 (A, B) and the second stock conveyor 9 is at a standstill, the rising arm lifts this electrode on its way and thus the series of motions just described is started again. The limit switch LS10 installed on a disc that is connected to the motor M3 is connected to the control circuit of the motor M3 in such a way that each time the disc is rotated through a predetermined angle, the motor is stopped, thereby the arranging conveyor 13 is driven in an intermittent motion, with the result that the electrodes 25 transferred from the transfer apparatus 20 by the transfer arm one by one are arranged at approximately uniformly spaced intervals on the arranging conveyor. The limit switch LS11 installed at the right end of said arranging conveyor 13 is related to the control circuit of the motor M3 in such a way that when an electrode 25 reaches the right end position, tripping the limit switch LS11, the motor M3 is stopped and the arm of the transfer apparatus 20 is stopped upon tripping the limit switch LS7. The limit switch LS9 installed between the limit switches LS7 and LS8 may be connected to the control circuit of the arranging conveyor 13 driving motor M3 in such a way in replacement of the limit switch LS8, that it starts the conveyor driving motion of the motor M3 as soon as the arm of the transfer apparatus 20 transfers an electrode 25 onto the arranging conveyor 13, thereby somewhat reducing the time required to start the transfer conveyor from the previously described method wherein the limit switch LS8 is connected to the control circuit of the motor M3. In this way, when the arranging conveyor 13 is fully loaded with electrodes 25 or a sufficient number of electrodes are arranged on it to be lifted by the hanger 24, the whole electrodes are lifted by the hooks on the hanger 24, for the purpose of bringing it to and inserting in an electrolytic cell or in other devices.

Figure 6:
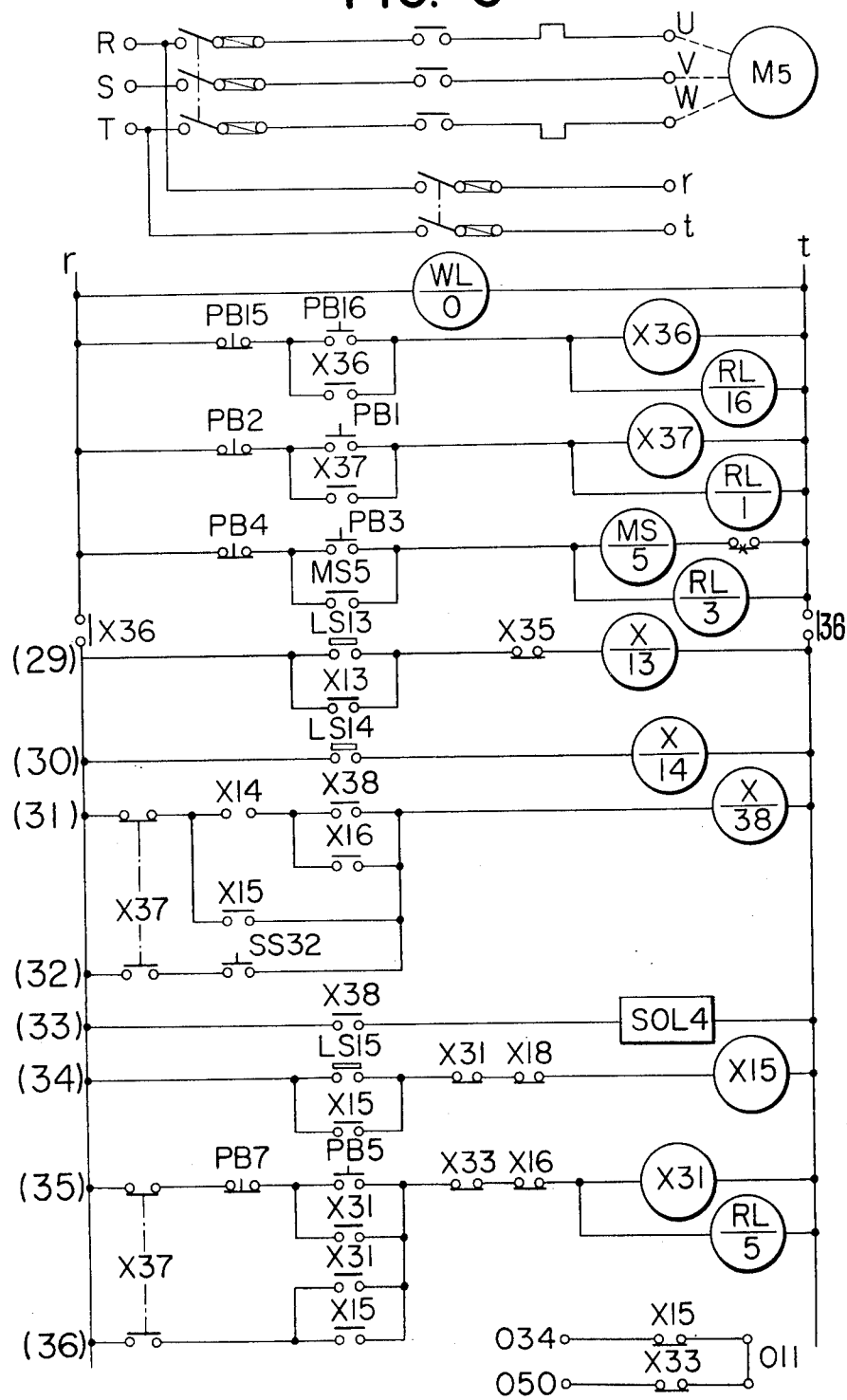
Figure 7:
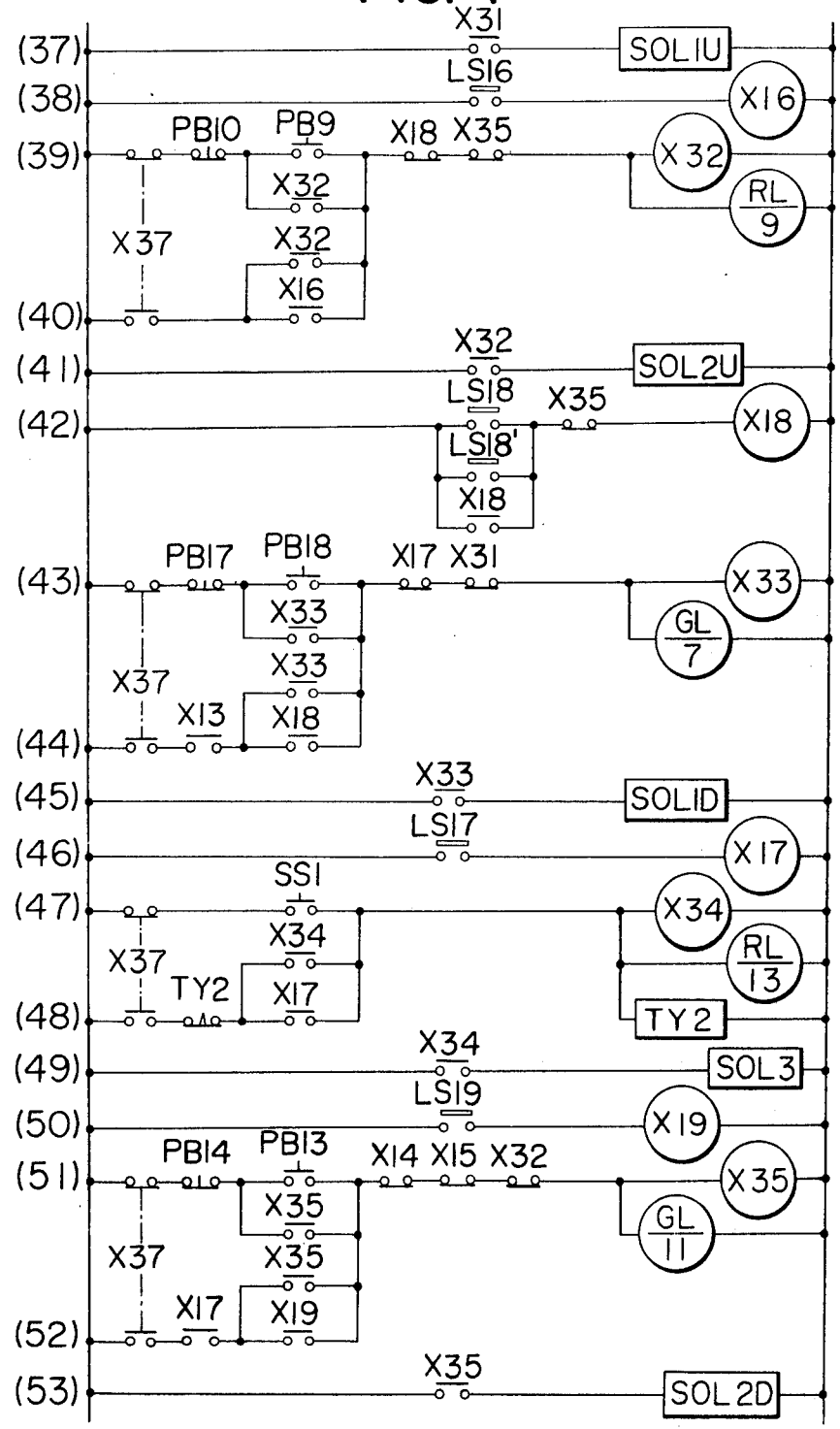
Figure 8:
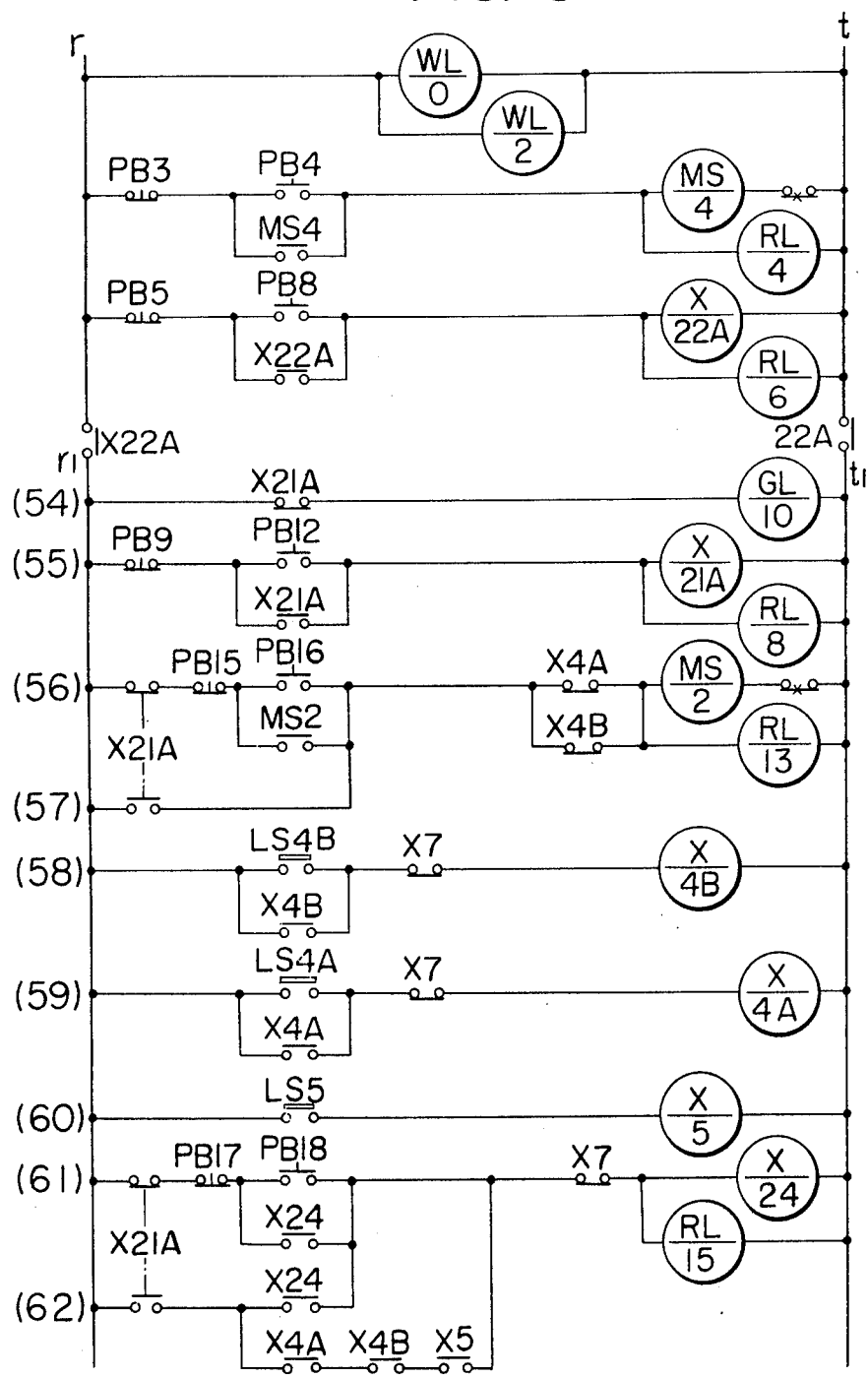
Figure 9:
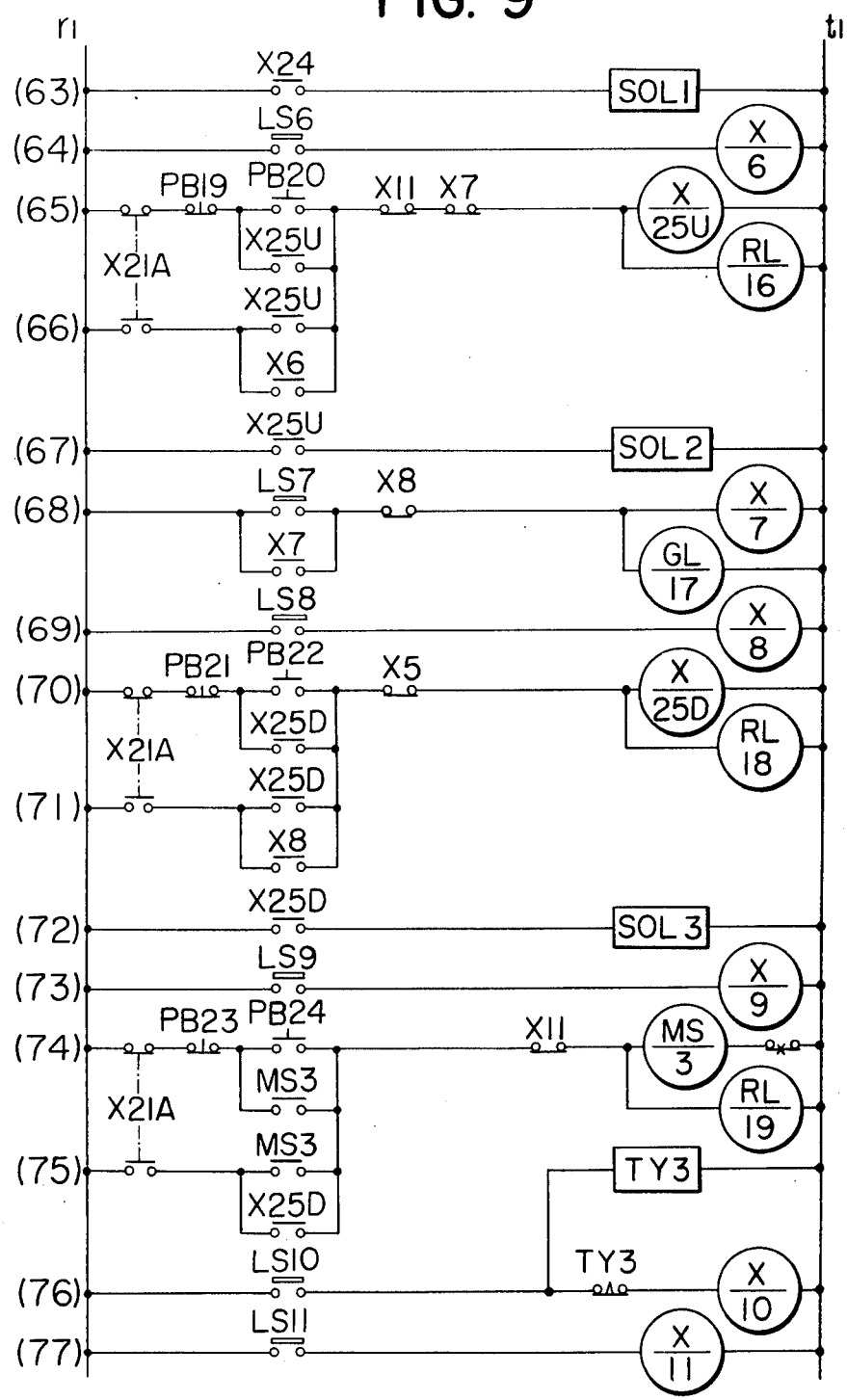

Now those motions of the embodiment shown in FIG. 1 will be described in reference to the circuit diagrams shown in FIGS. 5 through 10, wherein each line is identified by one of the numbers (20) through (77) attached at one end thereof, relays related to contacts XO, X2 . . . and MS1, MS2 . . . are represented by X/O, X/2 . . . and MS/1, MS/2, time delay contacts and their related timer relays are represented by TY1, TY2 . . . , and push buttons are control circuit diagrams mainly related to the first stock apparatus a, FIGS. 6 and 7 are control circuit diagrams mainly related to the transfer apparatus d, and FIGS. 8 and 9 are control circuit diagrams mainly related to the second stock apparatus b and the arranging apparatus c.

1. Arrangement of electrodes or other objects on the first stock apparatus a.

As cast electrodes 25 are delivered to the conveyor 5, they are hung on the hooks provided thereon, one by one, and are sent down at a uniform space towards the first stock conveyor 4 located beneath it. In their way down, when they trip the limit switch LS1, the relay X/1 in the line (22) (object detection line) closes contact X1 in the line (26) (counter line) thereby counting the number of electrodes that passed the limit switch LS1, and at the same time, energizes the timer TY4 in the line (22). The timer TY4 is so adjusted that after an electrode 25 descending on the conveyor 5 trips the limit switch LS1, just coinciding with the transfer time of the electrode onto the first stock conveyor 4, said timer TY4 is actuated to close the time delay contact TY4 in the line (24) (control line for the first stock conveyor 4), thereby starting the motor M1 through the relay MS/1 and thus starting the first stock conveyor 4. Then, when the first stock conveyor carries the received electrode through 20 to 50 mm, the limit switch LS2 is tripped thereby closing the contact X2 on the line (24) by the actuation of the relay X/2, and consequentially deenergizing the relay MS/1 to stop the motor M1. By repeating these motions, on the first stock conveyor 4, the number of electrode suspended at a regular interval is steadily increased until there are 10 electrodes that form one block 27. When the last electrode 25 forming one block trips the limit switch LS1, in addition to the abovementioned functions, the contact K on the line (27) (block detection line) is closed by a command from the counter line (26), with the result that because the contact X23 on the line (24) is closed by the relay X/23, the first stock conveyor driving motor is kept in an operable state even when the contact X2 on the same line is opened by the actuation of the limit switch LS2. On the other hand, by the actuation of the timer TY2 on the line (27), the time-delay contact TY2 is switched over with the result that current is sent through the time delay contact TY5 — the motor M1 is driven — the first stock conveyor 4 is driven — then one block 27 is sent through approx. 200 mm. At this time, through the actuation of the timer TY5, the time delay contact TY5 on the line (27) is opened — relay X/23 is deenergized — contact X23 on the line (23) opens —then, motor M1 is stopped. In this way, when the first electrode 25 of the next block arrives at the first conveyor 4, there is approx. 200 mm space after the last electrode 25 of the last block 27, and there will be always a uniform interval between all subsequent blocks 27. By repeating these motions, finally, several blocks of electrodes, each block 27 consisting of a uniform number of electrodes, will be arrayed at a uniform interval on the first stock conveyor 4. The blocks of electrodes arrayed on the first stock conveyor 4 are transported in this way towards the right until the foremost electrode 25 of the foremost block 27 trips the limit switch LS3, whereupon the relay X/3 in the line (28) (full load detection line for the first conveyor 4) is actuated to open the contact X3 on the line (23), and thereby to stop the motor M1. The conveyor 5 is stopped similarly thereby.

2. Conveying electrodes through transfer apparatus $d$.

i. Transfer of blocks 27 from the first stock conveyor to the truck 16.

The truck 16 is provided with two hanging hooks 19 which are actuated by the hydraulic cylinders 17, and which are always positioned underneath the lugs 26 of the electrodes 25, as shown in FIG. 2, in such a way that whenever the hooks 18 are lifted, the block 27 of electrodes can be immediately lifted. If there is no electrode 25 or there are only electrodes less than one block, when the truck 16 moves towards the left end of its stroke, the limit switch LS14 is tripped by said stopper installed at the left end thereby opening the contact X14 on the line (51) (return control line for truck) by the action of the relay X/14 on the line (30) (truck return limit detection line), thereby denergizing the relay X/35 to open the contact X35 on the line (52), with the result that the truck 16 is stopped and kept in the stopped condition until one block 27 of electrodes will be accumulated. When sufficient number of electrodes to form one block 27 is mounted on the first stock conveyor 4 and the foremost electrode 25 comes in contact with the limit switch LS15, the contact X15 on the line (36) (hook lifting control line) is closed by the relay X/15 on the line (34) (object detection line), thereby the contact X31 on the line (37) is closed by the relay X/31, with the result that the hydraulic valve SOL1U is actuated to drive the cylinders 17, to lift the hooks 19, suspending the complete block 27. When the hooks trip the limit switch LS16 at the upper stroke end of the hooks, the contact X16 on the line (36) is opened by the relay X/16 on the line (38) to stop the hook lifting motion, and simultaneously the contact X16 on the line (40) is closed so that the hydraulic valve SOL2U is energized with the result that hydraulic fluid is supplied to a horizontal power cylinder so that the truck 16 is driven forward with one block 27 of electrodes suspended therefrom.

If one or more blocks of electrodes are arrayed on the first stock conveyor 4 when the truck 16 moves from right to left, the limit switch LS15 is tripped by the forwardmost electrode of the forwardmost block 27, before the limit switch LS14 is tripped by the stopper, with the result that the contact X15 on the line (51) is opened by the relay X/15 on the line (34), to stop the return motion of the truck 16 and the contact X15 on the line (36) is closed to lift the hooks 19, thereby lifting the block 27 of electrodes and sending the truck forward in the same sequence as in the previously described case.

ii. Transferring the block 27 from the truck 16 on to the second stock conveyor 9

When the truck 16 moves forward towards the second stock conveyor 9, if there is no electrode 25 on the second stock conveyor, first, the limit switch LS13 is tripped by a dog disposed on the second stock conveyor 9 at a distance approximately corresponding to the space of the suspended block 27, from the left end of conveyor 9, thereby the interlock is released by the closing of the contact X13 on the line (44) (hook descend conrol line) by the relay X/13 on the line (29) (hook descend interlocking line), and then, the truck 16 moves on further forward until the limit switch LS18' is tripped by the stopper provided at the right end of the second stock conveyor 9. The tripping of the limit switch LS18' then results in the actuation of the relay X/18 on the line (42) (truck forward limit position detection line) — opening the contact X18 on the line (40) — deenergizing the relay X/32 — opening the contact 32 on the line (41) — deenergizing the hydraulic valve SOL2U — stopping the truck 16, and simultaneously, closing the contact X18 on the line (44) — closing the contact X33 on the line (45) by the relay X/33 — energizing the hydraulic valve SOL1D — lowering the hooks 19. In descending, the hooks transfer the block 27 onto the second stock conveyor 9, but goes on descending until it trips the limit switch LS17 at the lower end of its stroke, whereupon opening the contact X17 on the line (44) by the relay X/17 on the line (46) — opening the contact X33 on the line (45) by deenergizing the relay X/33 — deenergizing the hydraulic valve SOL1D — stopping the descending motion of the hooks 19, at the same time, closing the contact X17 on the line (48) (limit switch base lift cylinder driving line) — closing the contact X34 on the line (49) by the relay X/34 — energizing the hydraulic valve SOL3 — lifting the limit switch base. The limit switch base trips the limit switch LS19 at its upper stroke end thereby closing the contact X19 on the line (52) by the relay X/19 on the line (50) (limit switch base upper limit detection line) — closing the switch X35 on the line (53) by the relay X/35 — energizing the hydraulic valve SOL2D — driving the truck 16 backward, on the other hand, the timer TY2 on the line

(48) opens the time delay contact TY2 after a preset time — deenergizing the relay X/34 — opening the contact X34 on the line (49) — deenergizing the hydraulic valve SOL3 — the limit switch base descends to the original position.

If there are one or more electrodes on the second stock conveyor 9 the advancing truck 16 first has the limit switch LS13 tripped by the stopper on the second conveyor 9, thereby releasing the interlock on the descending motion of the hooks 19, as before, then the truck 16 moves on further so that the limit switch LS18 is tripped by the leftmost electrode 25 on said stock conveyor 9, before the limit switch 18' is tripped by the stopper at the right end of said conveyor. Thereupon the truck 16 is stopped by the actuation of the relay X/18 on the line (42), and at the same time, the hooks 19 are lowered, thereby the block 27 is transferred onto the second stock conveyor 9 and the truck starts to return as in the previous case.

If the second stock conveyor 9 is fully loaded with electrodes or if there is only a space smaller than one block space, the limit switch LS18 on the advancing truck 16 is tripped by the leftmost electrode on the second stock conveyor 9, before the limit switch LS13 is tripped by the stopper, thereby the truck 16 is stopped because the contact X18 on the line (39) is opened by the relay X/18. However, in this case, although the contact X18 on the line (44) is closed by said relay X/18, because the limit switch LS13 is still open and therefore the relay X/13 on the line (29) is not energized, the contact X13 on the line (44) is kept open, with the consequence that even when the truck 16 is stopped, the hooks 19 remain at their upper positions. Thus, the truck 16 is left in that position motionless, only to be driven forward as the electrodes on the second stock conveyor 9 are reduced. Only when the truck 16 moves so far forward, advancing stepwise, as to have its limit switch LS13 tripped by the dog, then, the contact X13 on the line (44) is closed, this closing signifying the presence of a sufficient space for one block of electrodes on the stock conveyor, thereby the hooks descend first to transfer the block on the conveyor and then to retreat.

3. Movement of electrodes or other objects on the second stock apparatus *b* and on the arranging *c*.

When the block 27 transferred onto the second stock conveyor that constitutes the principal member of the second stock apparatus *b* from the truck 16 arrives at the right end of said conveyor, through the intermittent driving motion thereof, the block trips both the limit switches LS4 (A, B), thereby actuating the relays X/4B and X/4A on the lines (58) and (59) respectively to open the contacts X4A and X4B on the line (57) (control line of the second stock conveyor 9), with the result that the relay MS/2 is actuated to stop the motor M2 and consequently to stop the second stock conveyor 9. However, because at this time, in the electrode suspension region underneath the position of said limit switches LS4 (A, B), the arm (not shown) of the transfer apparatus 20 is stationed in readyness, keeping the limit switch LS5 in a tripped condition, thereby keeping the contact X5 on the line (62) (arm lift cylinder control line) of the relay X/5 on the line (60) in the closed condition, when said relays X/4A and X/4B close their contacts X4A and X4B on the line (62), thereby the relay X/24 closes its contact X24 on the line (63), the hydraulic valve SOL1 is energized to lift the arm of the apparatus 20 which arm picks up one electrode 25 on its way. At the upper stroke end, the arm trips the limit switch LS6, thereby actuating the relay X/6 on the line (64) which closes its contact X6 on the line (66) (arm advance cylinder control line), thereby the relay X/25U energizes the hydraulic valve SOL2, which drives the arm towards the right without letting it to descend until the electrode 25 is carried to the right stroke end of the arm above the arranging conveyor 13. At this position, the electrode trips the limit switch LS7, which then actuates the relay X/7 on the line (68) to open the contact X7 on the line (65), with the result that the arm stops its advance motion, and simultaneously, because the contact X7 on the line (61) is opened, the hydraulic valve SOL1 is deenergized so that the transfer arm is lowered automatically. At the same time, because the contacts X7 on the line (58) and on the line (59) are also opened when the relay X/7 is energized, relays X/4A and X/4B are deenergized, thereby the contacts X4A and X4B on the line (57) are closed, the motor M2 is again driven through the relay MS/2, thereby the next electrode is sent up to where it trips the limit switches LS4 (A, B), stopping the second stock conveyor 9 as before. In the meantime, the descending arm transfers the electrode it carried onto the arranging conveyor 13 on its way down, and then, descending further, trips the limit switch LS8 at the lowest point of its stroke, thereby closing the contact X8 on the line (71) (arm retreat cylinder control line) by its relay X/8 on the line (69), and consequently closing the contact X25D on the line (72) by its relay X/25D to energize the hydraulic valve SOL3, which makes the transfer arm move back from right towards left. Simultaneously, the contact X25D on the line (75) (control line of the arranging conveyor) of said relay X/25D is closed, thereby the relay MS/3 drives the motor M3, which in turn drive the arranging conveyor 9 forward, consequently sending the electrode 25 transferred from the arm forward. On the other hand, the retreating arm trips the limit switch LS5 again at its left stroke end, thereby closing the contact X5 on the line (62) by its relay X/5 on the line (60), and consequently lifting the arm immediatey, which in its way upward, picks up an electrode 25 as before, thus initiating another transfer cycle of the electrode onto the arranging conveyor 13. In the meantime, when the motor M3 drives the arranging conveyor through a predetermined distance, a disc mounted on the shaft of the motor M3 trips the limit switch LS10, which actuates the relay X/10 on the line (76) to open its contact X10 on the line (74), which deenergizes the relay MS/3 to stop the motor M3, with the result that there is a predetermined space made before the electrode that comes onto the arranging conveyor next. In this way, all the electrodes on the arranging conveyor 13 are arranged at a uniform spacing, and are conveyed forward, until the foremost electrode trips the limit switch LS11, whereupon the relay X/11 on the line (77) (electrode full load detection line) is energized to open the contact X11 on the line (65), with the result that the arm forward driving cyclinder is kept motionless even when the arm, rising with a next electrode, trips the limit switch LS6 to close the contact X6 on the line (66). If there is no electrode on the second stock conveyor 9, because the contact X5 is connected in series with the contact X4A and X4B on the arm lift conveyor between the power source, unless the contact X4A and X4B are closed by an electrode, even when the contact X5 is closed, the arm is prevented from rising and is kept in its lower position in readyness for a next motion. It should be noted furthermore, that while in the foregoing description, the contact 25D in the line (75) (control line for the arranging conveyor 13) is assumed to be closed as a consequence of the tripping of the limit switch LS8, if the limit switch LS9 is re-arranged so as to be tripped by the arm just when it has transferred an electrode onto the arranging conveyor 13 on its descending stroke carrying that electrode, and further if the contact X25D on the line (75) is replaced by a contact X9 so that this contact on the line (75) is closable by the actuation of the relay X/9 on the line (73), the arranging conveyor 13 is set in motion already before the limit switch LS8 is tripped, thereby some advantage is gained from the accelerated function of the arranging conveyor 13. When the arranging conveyor 13 becomes fully loaded, the whole electrodes on it are lifted by the hanger 24 disposed thereabove, with the result that the limit switch LS11 is opened, thereby deenergizing the relay X/11 to close the contact X11 on the line (65) which enables the advance motion of the transfer apparatus and consequently enables the same cycle of operations as before. While a few embodiment of the invention have been illustrated and described in detail above, it is particularly understood that the invention is not limited thereto or thereby.

What is claimed is:

1. An apparatus for transporting articles, such as electrode plates, comprising:
   a first conveyor having a first conveyor member adapted to have said articles deposited thereon and transported thereby, said first conveyor member extending substantially horizontally and having a loading station and a discharge station associated therewith for respectively permitting articles to be loaded on and removed from said first conveyor member, and a first power device interconnected to said first conveyor member for drivably moving same;
   a second conveyor having a second conveyor member adapted to have groups of said articles deposited thereon and transported therealong, each said group containing a preselected number of adjacent articles, said second conveyor member extending substantially horizontally and having supply and removal stations associated therewith for respectively permitting the articles to be deposited on and removed from said second conveyor member, and a second power device interconnected to said second conveyor member for drivably moving same;
   feeding means associated with said first conveyor for sequentially depositing said articles one-by-one on said first conveyor member at said loading station;
   transfer means movable back and forth between said first and second conveyors for transferring articles from the discharge station of said first conveyor member to the supply station of said second conveyor member, said transfer means including a movable carriage;
   drive means for causing said carriage to be moved back and forth between a pickup position wherein said carriage is disposed over said first conveyor member and a discharge position wherein said carriage is disposed over said second conveyor member;
   said transfer means also including article engaging means supported on said carriage for vertical movement relative thereto, and motor means coacting between said carriage and said article engaging means for controlling lifting and lowering of said article engaging means;
   first control means for detecting the presence of a group of articles on said first conveyor member when said carriage is moving rearwardly from said second conveyor toward said first conveyor for stopping said carriage and energizing said article engaging means for lifting said group upwardly from said first conveyor member;
   second control means coacting between said transfer means and said second conveyor when said carriage is being moved forwardly from said first conveyor toward said second conveyor for detecting the presence of a preselected space on said second conveyor member of a size capable of permitting said group to be deposited thereon, said second control means preventing lowering of said group onto said second conveyor member so long as said preselected space is not present; and
   third control means for detecting the presence of the rearmost article on said second conveyor member and for stopping said carriage and energizing said motor means whereby said group is lowered into engagement with said second conveyor member, said third control means being operable only after said second control means has been activated so as to indicate the presence of said preselected space; and
   fourth control means for activating said transfer means to return said carriage toward said first conveyor upon depositing of the group of articles on said second conveyor member.

2. An apparatus according to claim 1, including:
   fifth control means for stopping the return movement of said carriage when said carriage reaches a preselected location relative to said first conveyor member which is adjacent said loading station without sensing the presence of a group of articles on said first conveyor member; and
   sixth control means for stopping the forward movement of said carriage adjacent the removal station on said second conveyor member when said carriage moves forwardly without sensing the presence of a rearmost article on said second conveyor member, said sixth control means also causing lowering of said article engaging means so that the group carried by said transfer means is deposited on said second conveyor member.

3. An apparatus according to claim 2, including:
   seventh control means for detecting the articles which are supplied to said first conveyor member from said feeding means and for energizing said first power device to cause an intermittent steplike movement of said first conveyor member so that said articles are deposited on said first conveyor member in adjacent and aligned relationship, said seventh control means also including counting means for counting a preselected number of articles as supplied to said first conveyor member and timer means for permitting selected energization of said first power device whereby said first conveyor member is moved through a larger distance prior to depositing of a further article on said first conveyor member so that adjacent groups of articles are spaced apart by a distance which is greater than the spacing between the articles within each group; and eighth control means for detecting the presence of the frontmost article of the frontmost group when located at the discharge station of said first conveyor member for preventing energization of said first power device.

4. An apparatus according to claim 3, including:

ninth control means for detecting the presence of the frontmost article on said second conveyor member when located in said removal station for preventing energization of said second power device, said ninth control means causing energization of said second power device and movement of said second conveyor member when an article is not located at said removal station whereby the articles on said second member are moved forwardly so that the frontmost article is moved into said removal station.

5. An apparatus according to claim 1, including:

a third conveyor having a third conveyor member adapted to have articles deposited thereon and transported therealong, and a third power device connected to said third conveyor member for drivably moving same;

second transfer means movable back and forth between said second and third conveyors for transferring articles from said second conveyor member to said third conveyor member, said second transfer means including a second carriage movable back and forth from the removal station of said second conveyor member to a depositing station located over the inlet end of said third conveyor member;

said second transfer means including second article engaging means and second motor means drivingly connected to said second article engaging means so that said second article engaging means can lift an article out of engagement with said second conveyor member and lower the article into engagement with the third conveyor member, said second article engaging means lifting only a single article from said second conveyor member;

fifth control means for stopping the forward movement of said second carriage when positioned over said depositing station and for energizing said second motor means whereby said article is lowered into engagement with said third conveyor member;

sixth control means for initiating the return movement of said second carriage after said article has been deposited on said third conveyor member; and seventh control means for stopping the return movement of said carriage when located over the removal station of said second conveyor member and for energizing said second motor means to lift an article from the removal station of said second conveyor member and for initiating the forward movement of said second carriage.

6. An apparatus according to claim 5, wherein said sixth control means also causes energization of said third power device to thereby cause movement of said third conveyor member after the article has been deposited thereon; and eighth control means for deenergizing said third power device after said third conveyor member has been moved a preselected distance whereby said sixth and eighth control means coact to result in intermittent energization of said third conveyor member so that the articles thereon are individually spaced a preselected distance apart in the longitudinal direction of the third conveyor member.

7. An apparatus according to claim 6, wherein said fifth control means upon stoppage of the forward movement of said second carriage also causes energization of said second power device so that said second conveyor member is moved forwardly until the frontmost article is moved into said removal station.

* * * * *